United States Patent
Hirade (10) Patent No.: US 9,689,892 B2
(45) Date of Patent: Jun. 27, 2017

(54) SCANNING PROBE MICROSCOPE

(71) Applicant: Shimadzu Corporation, Kyoto-shi (JP)

(72) Inventor: Masato Hirade, Kyoto (JP)

(73) Assignee: Shimadzu Corporation, Nakagyo-ku, Kyoto-shi, Kyoto (JP)

( * ) Notice: Subject to any disclaimer, the term of this patent is extended or adjusted under 35 U.S.C. 154(b) by 0 days.

(21) Appl. No.: 15/127,463

(22) PCT Filed: Mar. 20, 2014

(86) PCT No.: PCT/JP2014/057839
§ 371 (c)(1),
(2) Date: Sep. 20, 2016

(87) PCT Pub. No.: WO2015/140996
PCT Pub. Date: Sep. 24, 2015

(65) Prior Publication Data
US 2017/0131324 A1    May 11, 2017

(51) Int. Cl.
G01Q 10/06    (2010.01)

(52) U.S. Cl.
CPC .................................. G01Q 10/065 (2013.01)

(58) Field of Classification Search
CPC ........ G01Q 10/00; G01Q 10/02; G01Q 10/04; G01Q 10/045; G01Q 10/06; G01Q 10/065; G01Q 30/04; G01Q 30/06; G01Q 40/00; G01Q 40/02; G01Q 60/24; G01Q 60/32; G01Q 60/36; B82Y 35/00
See application file for complete search history.

(56) References Cited

U.S. PATENT DOCUMENTS

| 6,194,813 B1* | 2/2001 | Israelachvili | B82Y 35/00 |
| | | | 310/328 |
| 7,732,985 B2* | 6/2010 | Choi | H02N 2/028 |
| | | | 310/311 |

FOREIGN PATENT DOCUMENTS

JP    2005-233669    9/2005

OTHER PUBLICATIONS

International Search Report of PCT/JP2014/057839, Jun. 27, 2014.

* cited by examiner

*Primary Examiner* — David E Smith
(74) *Attorney, Agent, or Firm* — Muir Patent Law, PLLC (57) ABSTRACT

A scanning probe microscope includes sample moving means 111 and 133 including a cylindrical piezoelectric scanner and configured to move a sample 110 arranged on an upper end surface of the piezoelectric scanner by bending the piezoelectric scanner 111 by an applied voltage, scanning control means configured to control a relative position of the probe 114 and the sample 110 by controlling the applied voltage, sample thickness acquisition means 138 configured to acquire a thickness value of the sample 110, and correlative information determination means 139 configured to determine correlative information showing a corresponding relationship between the applied voltage to the piezoelectric scanner 111 and a displacement amount of a surface of the sample 110 in a horizontal direction using the thickness value, wherein the scanning control means 132 performs controlling of the relative position using the correlative information. With this, it becomes possible to perform accurate sample scanning considering effects on the movement amount of the sample 110 in the XY direction due to the thickness.

10 Claims, 7 Drawing Sheets

SCANNING PROBE MICROSCOPE

TECHNICAL FIELD

The present invention relates to a scanning probe microscope (SPM) mainly used for observing a three-dimensional shape of a sample surface.

BACKGROUND ART

A scanning probe microscope is a microscope capable of acquiring a high magnification observation image of a sample surface by detecting any interaction between a probe and a sample while scanning the sample surface with a minute probe. Scanning probe microscopes include a scanning tunneling microscope (STM) that detects an electrical current flowing between a probe and a sample as an interaction and an atomic force microscope (AFM) that detects an atomic force acting between a probe and a sample as an interaction.

Figure 6:
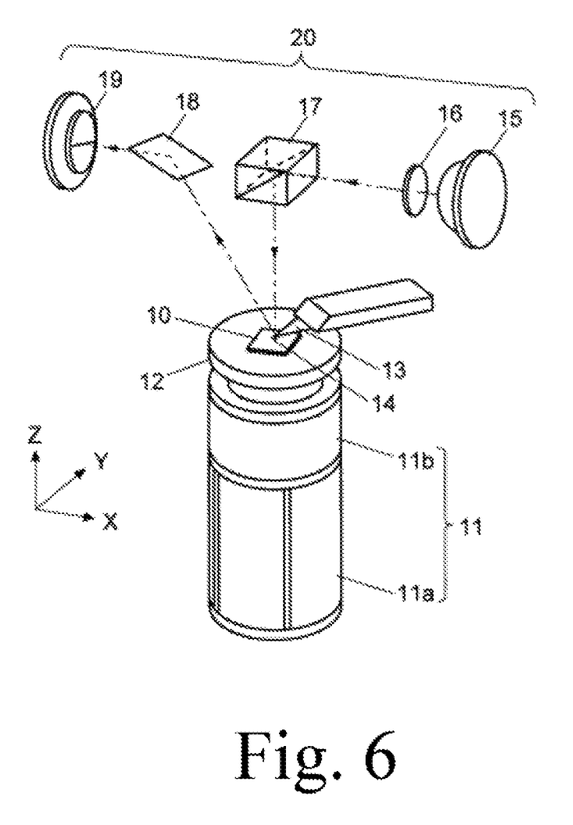
FIG. 6 is a view showing a basic configuration of a detection part of an atomic force microscope.

A basic configuration of a detection part of a conventionally known AFM is shown in FIG. 6 (see, Patent Document 1, etc.). A sample 10 to be observed is held on a sample stand 12 provided on a substantially cylindrical piezoelectric scanner 11. This piezoelectric scanner 11 includes an XY scanner 11a for moving the sample 10 in two directions of the X-axis and the Y-axis perpendicular to each other, and a Z scanner 11b for minutely moving in Z-axis direction perpendicular to the X-axis and the Y-axis. These scanners 11a and 11b are each equipped with a piezoelectric element (piezo element) that causes a displacement in a predetermined range by a voltage applied from an outside as a driving source. Above the sample 10, a cantilever 13 equipped with a probe 14 at the tip end is arranged. When the tip end of the sharp probe 14 attached to the cantilever 13 is brought close to the proximity (gap of a few nm or less) to the sample 10, an atomic force (attraction force or repulsion force) acts between the tip end of the probe 14 and the atoms of the sample 10. In this state, while scanning the sample surface by the piezoelectric scanner 11 so that the probe 14 and the sample 10 move relatively in the X-Y plane, the distance (in the Z-axis direction, or height) of the probe 14 from the sample 10 is feedback controlled so that the atomic force is kept constant. The feedback amount in the Z-axis direction corresponds to the irregularity of the surface of the sample. Therefore, based on this, a three-dimensional image of the sample surface can be obtained.

In the configuration of FIG. 6, to detect the displacements of the cantilever 13 in the Z-axis direction, a photometric unit 20 is provided above the cantilever 13. That is, the laser light emitted from the laser diode 15 is converged by the lens 16 and then reflected by the beam splitter 17 to be irradiated to the vicinity of the tip end of the cantilever 13. Then, the reflected light is detected by the light detector 19 via the mirror 18. The light detector 19 includes light receiving surfaces divided into plural (normally, two or four) sections in the displacement direction (Z-axis direction) of the cantilever 13. Since the ratio of the amount of incident light to the plurality of light receiving surfaces changes when the cantilever 13 is displaced up or down, the displacement amount of the cantilever 13 can be calculated by performing the calculation processing of the detection signal corresponding to the plurality of light-receiving amounts.

CITATION LIST

Patent Literature

Patent Literature 1: JP 2005-233669A

SUMMARY OF INVENTION

Technical Problem

Figure 7:
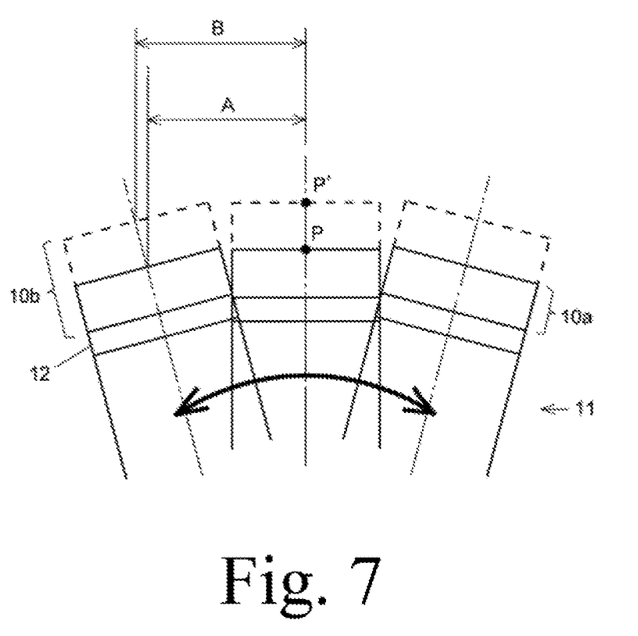
FIG. 7 is a schematic view explaining a relationship between a thickness of a sample and a displacement amount in a horizontal direction.

When scanning the sample surface by the scanning probe microscope, the probe 14 and the sample 10 are relatively moved in the X-Y plane by applying a voltage to the plurality of electrodes of the XY scanner 11a as described above. However, at this time, the piezoelectric scanner 11 performs a swinging motion as shown in FIG. 7 due to the deformations of the piezoelectric element, and therefore the movement amount of the sample attached to the tip end of the piezoelectric scanner 11 in the X-Y plane changes depending on the thickness of the sample (in the drawing, the sample stand is omitted for simplicity). For example, when a predetermined voltage is applied to the piezoelectric element of the XY scanner 11a in a state in which a sample 10a having a standard thickness is arranged, it is assumed that the movement amount of an arbitrary point P (for example, the center point) on the sample surface in the horizontal direction is A. Here, when the same voltage as described above is applied to the piezoelectric element of the XY scanner 11a in a state in which a sample 10b thicker than the aforementioned sample 10a is arranged on the same piezoelectric scanner 11, a movement amount B of an arbitrary point P' (for example, the center point) on the surface of the sample 10b in the horizontal direction becomes larger than the aforementioned amount A.

For this reason, in order to accurately control the movement amount of the sample, it is required to calibrate the scanning parameter (the relationship between the movement amount of the sample and the applied voltage to the piezoelectric element) depending on the thickness of the sample. When performing such calibration of the scanning parameter, as a standard sample for calibration, for example, a precision grid plate is used. A precision grid plate is a glass plate in which fine lattice-shaped grooves are engraved on the surface, and the thickness of the glass plate and the distance between the grooves are known. By observing the three-dimensional shape of the precision grid surface while changing the applied voltage to the piezoelectric scanner 11 in a state in which the precision grid plate is arranged on the piezoelectric scanner 11, the movement amount of the sample surface with respect to the applied voltage to the XY scanner 11a can be known. However, it is a very troublesome and time consuming work for a user to perform such calibration every time different thickness samples are measured. Further, since it is not easy to match the thickness of a sample for an actual observation and the thickness of a standard sample for calibration, it is difficult to perform an accurate calibration.

The present invention was made in view of the aforementioned problems, and aims to provide a scanning probe microscope capable of easily performing an accurate observation of a sample surface regardless of a thickness of a sample.

Solution to Problem

A scanning probe microscope according to the present invention made to solve the aforementioned problems is a scanning probe microscope for detecting a three-dimensional shape or a physical quantity of a sample surface by scanning the sample surface by a minute prove. The scanning probe microscope includes:

a) sample moving means including a cylindrical piezoelectric scanner and configured to move a sample arranged on an upper end surface of the piezoelectric scanner by bending the piezoelectric scanner by an applied voltage;

b) scanning control means configured to control a relative position of the probe and the sample by controlling the applied voltage;

c) sample thickness acquisition means configured to acquire a thickness value of the sample; and d) correlative information determination means configured to determine correlative information showing a corresponding relationship between the applied voltage to the piezoelectric scanner and a displacement amount of a surface of the sample in a horizontal direction using the thickness value, wherein the scanning control means performs controlling of the relative position using the correlative information.

Further, a scanning probe microscope according to the present invention made to solve the aforementioned problems is a scanning probe microscope for detecting a three-dimensional shape or a physical quantity of a sample surface by scanning the sample surface by a minute probe. The scanning probe microscope include:

a) sample moving means including a cylindrical piezoelectric scanner and configured to move a sample arranged on an upper end surface of the piezoelectric scanner by bending the piezoelectric scanner by an applied voltage;

b) three-dimensional distribution data generation means configured to create three-dimensional distribution data showing a certain physical quantity at each position on the sample surface collected by moving the sample with respect to the probe by the sample moving means;

c) sample thickness acquisition means configured to acquire a thickness value of the sample; and d) correlative information determination means configured to determine correlative information showing a corresponding relationship between the applied voltage to the piezoelectric scanner and a displacement amount of a surface of the sample in a horizontal direction using the thickness value, wherein the three-dimensional distribution data generation means creates the three-dimensional distribution data using the correlative information.

The scanning probe microscope according to the present invention may further include:

e) sample thickness measurement means configured to measure a thickness of the sample, wherein the sample thickness acquisition means acquires a thickness value of the sample from the sample thickness measurement means.

The sample thickness measurement means may be a mechanism configured to drive the piezoelectric scanner and/or the probe in a direction that the sample and the probe move close to each other or move away from each other, and configured to obtain a thickness value of the sample from a driven amount of the piezoelectric scanner and/or the probe from a state in which the piezoelectric scanner and the probe are away from by a predetermined distance to a state in which the surface of the sample arranged on the upper end surface of the piezoelectric scanner and the probe are moved closer to a predetermined distance.

Further, it may be configured such that the scanning probe microscope itself is not provided with such sample thickness measurement means, and a thickness value of the sample measured by another measurement device (for example, a laser microscope or a step meter) provided outside the scanning probe microscope or a sample thickness value input by a user is acquired by the sample thickness acquisition means.

That is, the scanning probe microscope according to the present invention may further includes:

f) user input receiving means configured to receive an input of a thickness value of the sample by a user, wherein the sample thickness acquisition means acquires the thickness value of the sample from the user input receiving means.

Further, the scanning probe microscope according to the present invention may further include:

g) measurement value input receiving means configured to receive an input of a measurement value of the thickness value of the sample from an external measurement device, wherein the sample thickness acquisition means acquires the thickness value of the sample from the measurement value input receiving means.

Advantageous Effects of the Invention

According to the scanning probe microscope of the present invention having the aforementioned structure, controlling by the scanning control means or data processing by the three-dimensional distribution data creation means is performed based on the correlative information created considering the thickness value of the sample. For this reason, without performing a troublesome calibration operation by a user depending on the thickness of the sample to be measured, it becomes possible to easily perform an accurate observation of a sample surface.

DESCRIPTION OF EMBODIMENTS

[Embodiment 1]

Figure 1:
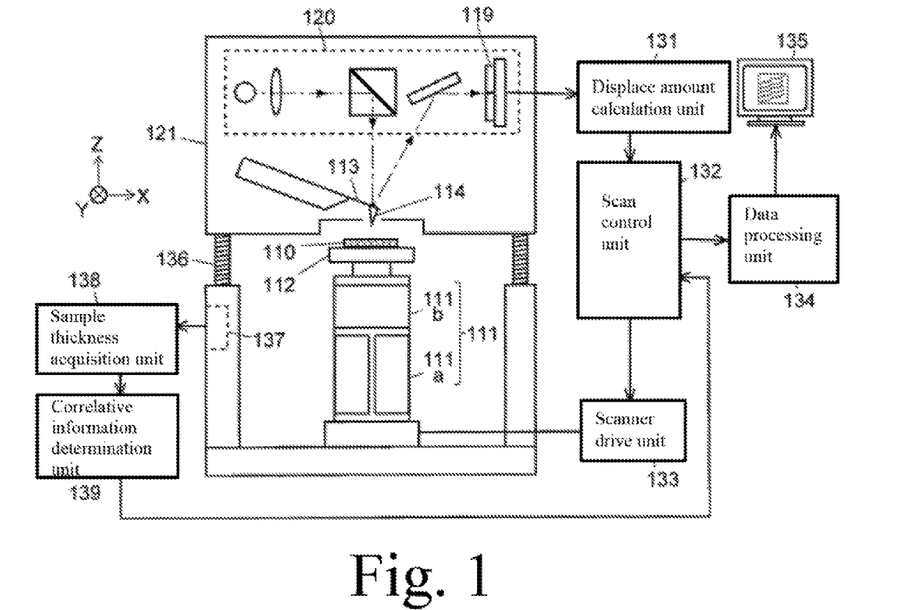
FIG. 1 is a structural view of a principle portion of a scanning probe microscope according to a first embodiment of the present invention.

FIG. 1 is a structural view of a principle portion of a scanning probe microscope according to a first embodiment of the present invention. As to the same structural element as that already explained with reference to FIG. 6, a symbol common to the symbol given in FIG. 6 in the last two digits will be given and the explanation will be omitted appropriately. In this embodiment (and the following Embodiments 2 and 3), the scanning probe microscope according to the present invention is applied to an atomic force microscope, but the present invention can also be applied to other scanning probe microscopes, such as, e.g., a scanning tunneling microscope.

In the scanning probe microscope of this embodiment, when performing a surface observation by approaching the tip end of the probe 114 to the sample 110, the detection signal from the light detector 119 divided into two sections in the Z-axis direction is input to the displacement amount calculation unit 131, and the displacement amount calculation unit 131 calculates the displacement amount of the cantilever 113 from the difference or the ratio of the receiving light quantities in both light receiving surfaces and input it to the scan control unit 132. The scan control unit 132 calculates the voltage value that displaces the piezoelectric scanner 111 in the Z-axis direction based on the displacement amount of the cantilever 113 so that the atomic force between the probe 114 and the surface of the sample 110 becomes always constant. Then, by applying the voltage of the calculated value to the piezoelectric scanner 111 from the scanner drive unit 133, the Z scanner 111b is slightly moved in the Z-axis direction. Further, the scan control unit 132 calculates the voltage value in the X-axis and Y-axis directions in accordance with the predetermined scan pattern so that the sample 110 moves relative to the probe 114 in the X-Y plane. Then, it applies a voltage of the calculated value from the scanner drive unit 133 to the piezoelectric scanner 111 to slightly move the XY scanner 111a in the X-axis and Y-axis directions. The signal reflecting the feedback amount (applied voltage to the scanner) in the Z-axis direction is also sent to the data processing unit 134, and the data processing unit 134 processes the single at each position in the X-axis and Y-axis directions to reproduce a three-dimensional image of the sample surface and depicts it on the screen of the display 135.

When the scan control unit 132 slightly moves the piezoelectric scanner 111 in three-axis direction independently as described above, correlative information showing the relationship between the applied voltage (scanner voltage) to the piezoelectric scanner 111 and the corresponding displacement amount of the sample 110 will become necessary. The correlative information is, for example, a value of displacement amount per unit applied voltage every X-axis, Y-axis, and Z-axis direction, or a formula, a graph, or a table showing the relationship between the displacement amount in each direction and the applied voltage, stored in an internal memory, and utilized at the time of performing the scanner drive control as described above.

The relationship between the applied voltage to the XY scanner 11a and the movement amount of the sample surface in the X-axis direction and the Y-axis direction (i.e., horizontal direction) changes depending on the thickness of the sample as described before (see FIG. 7). For this reason, in the scanning probe microscope of this embodiment, the correlative information for driving the scanner is set as follows.

Initially, the sample thickness acquisition unit 138 measures the thickness of the sample 110 arranged on the sample stage 112 as follows. In FIG. 1, the photometric unit 120 and the cantilever 113 are accommodated in the head section 121 provided above the piezoelectric scanner 111, and the head section 121 is movable in the up-and-down direction by a rough movement mechanism including a feed screw 136 and a screw drive mechanism 137. Here, the movement amount of the head section 121 when the head section 121 is lowered from a certain height (hereinafter referred to as "initial position") to a height that the distance between the probe 114 and the sample surface becomes a predetermined value (hereinafter referred to as "observation position") changes depending on the thickness of the sample, the thickness of the sample 110 can be obtained based on the movement amount.

When measuring the sample thickness by the scanning probe microscope of this embodiment, in advance, the movement amount of the head section 121 when the head section 121 is lowered from the initial position to a position where the distance between the probe 114 and the surface of the sample stage 112 becomes a predetermined value is stored in the sample thickness acquisition unit 138 as a "standard movement amount". The movement amount of the head section 121 can be obtained from the pitch of the feed screw 136 and the driven amount of the feed screw 136 by the screw drive mechanism 137. Then, the head section 121 is lowered from the initial position to the observation position in a state in which the sample 110 of the observation target is arranged on the sample stage 112, and from the difference between the movement amount of the head section 121 and the standard movement amount, the sample thickness acquisition unit 138 calculates the thickness of the sample 110.

The rough movement mechanism is not limited to a mechanism including the feed screw 136 and the screw drive mechanism 137 mentioned above, and may be, for example, a mechanism capable of moving the head section 121 up and down utilizing a piezoelectric element. In this case, based on the applied voltage to the piezoelectric element when lowering the head section 121 from the initial position to a height where the distance between the probe 114 and the surface of the sample 110 (or the sample stage 112) becomes a predetermined value, the movement amount of the head section 121 can be obtained.

Then, the correlative information determination unit 139 determines the correlative information showing the relationship between the applied voltage to the XY scanner 111a and the movement amount of the sample 110 in the X-axis direction and the Y-axis direction based on the sample thickness value acquired by the sample thickness acquisition unit 138. As the method for determining the correlative information, for example, the following method can be considered.

A. A Method of Using a Calibration Curve

Figure 2:
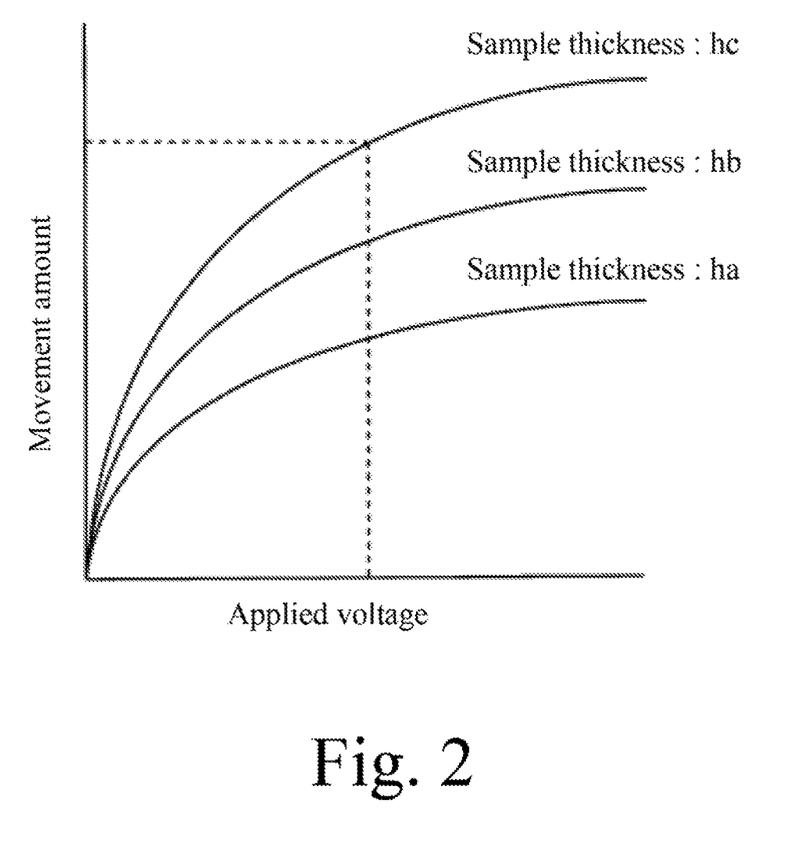
FIG. 2 is a view explaining one example of a method of determining a corrective information.

In this method, in advance, using a plurality of standard samples different in thickness (for example, the aforementioned precision grid plate), a plurality of calibration curves (see FIG. 2) showing the relationship between the applied voltage to the XY scanner 111a and the movement amount of the sample surface are created and stored in the correlative information determination unit 139. Then, based on the plurality of calibration curves, a calibration curve corresponding to the thickness of the sample 110 is determined as correlative information to be applied to the observation of the sample, and stored in the inner memory of the scan control unit 132. Here, the aforementioned "calibration curve corresponding to the thickness of the sample 110" may be, among the plurality of calibration curves, a calibration curve obtained from a standard sample having the same thickness as or having a thickness closest to the sample 110 of the observation target, or among the plurality of calibration curves, a calibration curve obtained in the thickness of the sample 10 by calculating from two or more calibration curves obtained on a plurality of standard samples having a thickness closer to the thickness of the sample 110 of the observation target.

Figure 3:
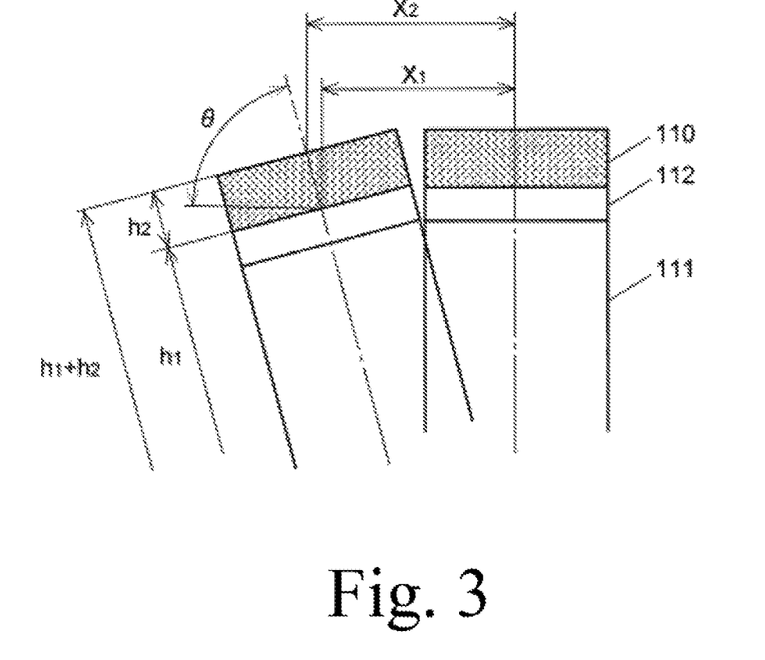
FIG. 3 is a view explaining another example of a method of determining a corrective information.

B. A Method for Calculating from the Movement Amount of the Reference Plane and the Sample Thickness In this method, a calibration curve showing the relationship between the applied voltage to the XY scanner 111a and the movement amount of the reference plane (for example, a surface of the sample stage 112) is created and stored in the correlative information determination unit 139. At this time, as shown in FIG. 3, when the height of the reference plane (for example, the distance from the lower end surface of the piezoelectric scanner 111 to the surface of the sample stage 112) is $h_1$, the thickness of the sample 110 is $h_2$, and the angle formed by the center axis of the piezoelectric scanner 111 and the horizontal surface is θ, the movement amount $X_2$ of the sample surface in the horizontal direction will be expressed by the following formula.

$$X_2 = (h_1 + h_2) \cos \theta \quad (1)$$

Further, when the movement amount of the reference plane in the horizontal direction is $X_1$, the aforementioned θ can be expressed by the following formula.

$$\theta = \cos^{-1}(X_1/h_1) \quad (2)$$

Therefore, by substituting Equation (2) into Equation (1), the relationship between the movement amount of the reference plane in the horizontal direction and the movement amount of the sample surface in the horizontal direction can be obtained. Further, the relationship between the movement amount of the reference plane in the horizontal direction and the applied voltage to the XY scanner 111a is known from the aforementioned calibration curve previously stored in the correlative information determination unit 139. Therefore, from the above, the relationship between the applied voltage to the XY scanner 111a and the movement amount of the surface of the sample 110 in the horizontal direction can be obtained. The correlative information determination unit 139 determines the information (formula or table) showing this relationship as correlative information, and store it in the internal memory of the scan control unit 132.

Thereafter, when the observation of the sample 110 is initiated, the scan control unit 132 determines the value of the applied voltage to the XY scanner 111a based on the correlative information and the target movement amount in the X-axis and Y-axis directions, and the scanner drive unit 133 applies the applied voltage to the XY scanner 111a. With this, an accurate XY scanning considering the thickness of the sample 110 can be performed. Therefore, by processing the signal (feedback amount of the aforementioned Z-axis direction) in each position in the X-axis and Y-axis direction obtained by the scanning, a distortion-free three-dimensional image of the sample surface can be depicted on the screen of the display 135.

In the above embodiment, utilizing the rough movement mechanism for moving the head section 121 to which the probe 114 is attached up and down, the thickness of the sample 110 is measured. However, the present invention is not limited to the above. For example, it may be configured such that another thickness measurement mechanism (for example, a step meter and a laser microscope) is mounted in a scanning probe microscope, and the value of the sample thickness measured by the thickness measurement mechanism is sent to the sample thickness acquisition unit 138.

[Embodiment 2]

Figure 4:
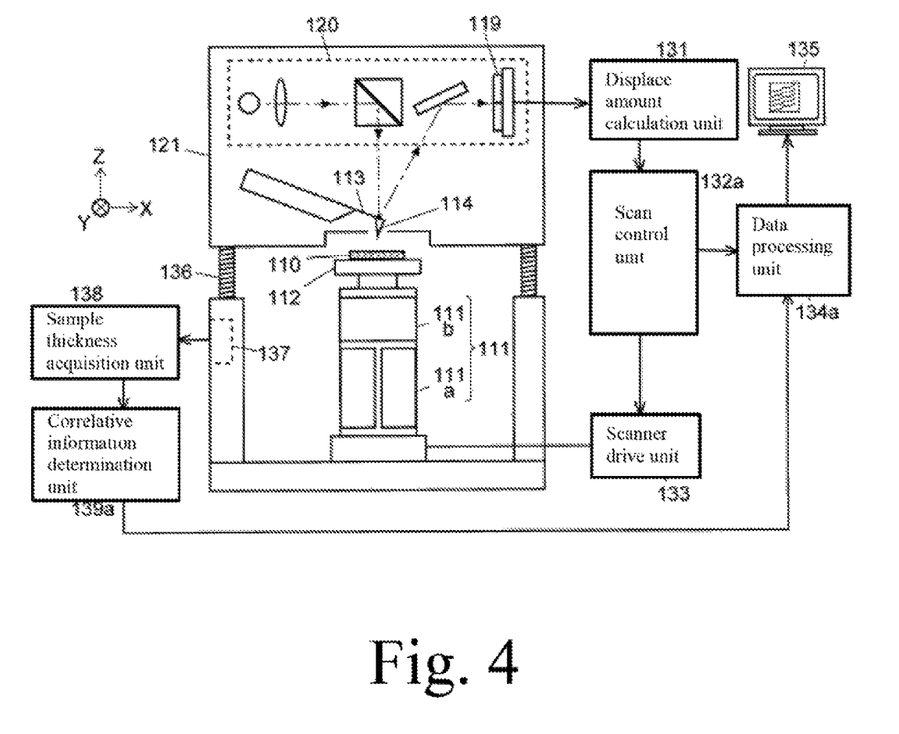
FIG. 4 is a structural view of a principle portion of a scanning probe microscope according to a second embodiment of the present invention.

FIG. 4 is a structural view of a principle portion of a scanning probe microscope according to a second embodiment. As to the same structural element as that explained with reference to FIG. 1, the same symbol as the symbol given in FIG. 1 will be allotted, and the description will be omitted arbitrarily.

The scanning probe microscope of this embodiment differs from Embodiment 1 in that the correlative information determined by the correlative information determination unit 139a is not used for the control of the piezoelectric scanner 111 by the scan control unit 132a, but is used for data processing in the data processing unit 134a.

When performing the observation of the sample using a scanning probe microscope of this embodiment, initially, in the same manner as in Embodiment 1, the thickness of the sample 110 is acquired by the sample thickness acquisition unit 138. Then, based on the thickness, at the correlative information determination unit 139a, the correlative information (hereinafter referred to as "data processing correlative information") showing the relationship between the applied voltage to the XY scanner 111a and the movement amount of the sample surface in the X-axis direction and the Y-axis direction is determined and stored in the data processing unit 134a. On the other hand, in the internal memory of the scan control unit 132a, as the information using to control the XY scanner 111a, the information showing the relationship between the applied voltage to the XY scanner 111a and the movement amount of the reference plane (for example, the surface of the sample stage 112) (hereinafter referred to as "scanner controlling correlative information") is stored in advance.

Then, in a state in which the tip end of the probe 114 is arranged at the close proximity to the sample 110, while performing the scanning by the XY scanner 111a so that the probe 114 and the sample 110 are moved relatively along the sample surface, the distance of the probe 114 from the sample (Z-axis direction height) is feedback controlled so that the atomic force between the probe 114 and the sample 110 is kept constant. The signals reflecting the applied voltage to the Z scanner 111b (i.e., the feedback amount in the Z-axis direction) and the applied voltage to the XY scanner 111a are also sent to the data processing unit 134a, and used for creating a three-dimensional image in the data processing unit 134a.

In this embodiment, for the control of the applied voltage to the XY scanner 111a, the scanner controlling correlative information on the basis of the surface of the sample stage 112 is used, and influences on the displacement amount in the X-axis direction and the Y-axis direction by the thickness of the sample 110 is not considered. Therefore, if the signal is used to create the three-dimensional image as it is, distortion occurs in the three-dimensional image to be obtained.

Therefore, in this embodiment, at the data processing unit 134a, from the data processing correlative information (i.e., the relationship between the applied voltage to the XY scanner 111a and the movement amount of the sample surface in the X-axis direction and the Y-axis direction), and the applied voltage to the XY scanner 111a at each time point of the aforementioned sample scanning, the position on the surface of the sample 110 of the measurement point at the aforementioned time point (i.e., the point that each feedback amount was acquired) is calculated. By forming a three-dimensional image of the sample surface using the obtained position of the measurement point at each time point and the feedback amount given at each time point from the displacement amount calculation unit 131, a distortion-free three-dimensional image considering the influence on the displacement amount in the X-axis direction and the Y-axis direction by the thickness of the sample 110 can be depicted on the screen of the display 135.

[Embodiment 3]

Figure 5:
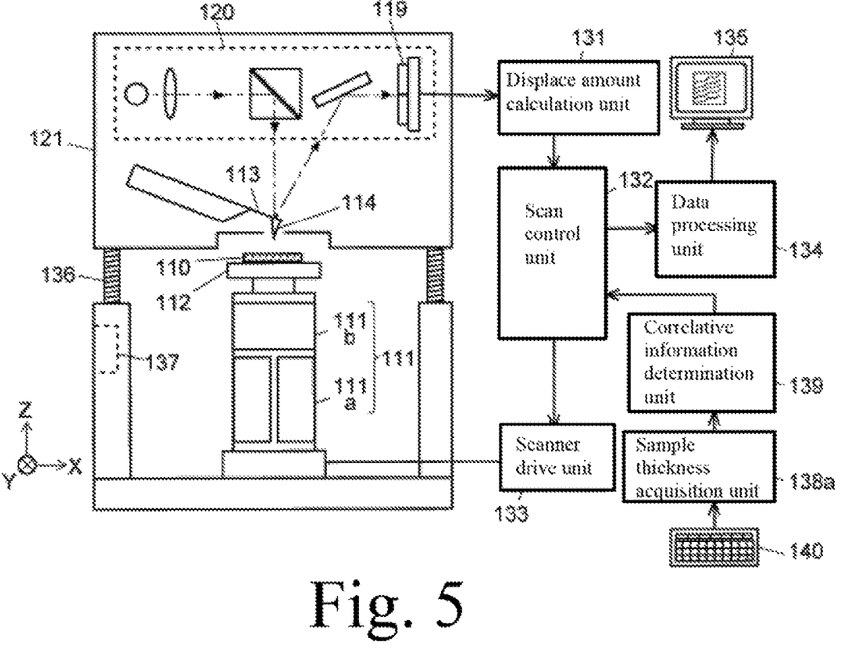
FIG. 5 is a structural view of a principle portion of a scanning probe microscope according to a third embodiment of the present invention.

FIG. 5 is a structural view of a principle portion of a scanning probe microscope according to a third embodiment. As to the same structural element as that explained with reference to FIG. 1, the same symbol as the symbol given in FIG. 1 will be allotted, and the description will be omitted arbitrarily.

This embodiment differs from Embodiment 1 in that the sample thickness acquisition unit 138*a* does not acquire the value of the sample thickness from the measurement mechanism embedded in the scanning probe microscope, the value of the sample thickness is acquired from the input from a user via an input unit 140 including a keyboard or the like. The value of the sample thickness acquired by the sample thickness acquisition unit 138*a* is, in the same manner as in Embodiment 1, used for determining the correlative information in the correlative information determination unit 139, and based on this correlative information, the scan control unit 132 controls the applied voltage to the XY scanner 111*a*. However, not limited to this, it may be configured such that the correlatgive information determined at the correlative information determination unit 139 is used for the data processing in the data processing unit 134 like in Embodiment 2.

Although embodiments for carrying out the present invention were described while exemplifying embodiments, the present invention is not limited to the aforementioned embodiments, and allows arbitral modifications within a range of the spirit of the present invention. For example, in the aforementioned embodiments, the value of the sample thickness is measured by the measurement mechanism embedded in the scanning probe microscope, or acquired from the input from a user. In addition to these, it may be configured such that an interface for connecting a measurement device (for example, a laser microscope or a step meter) structured separately from the scanning probe microscope is provided and the sample thickness acquisition unit acquires the measurement value of the sample thickness by the measurement device via the interface.

REFERENCE SIGNS LIST

10, 110 . . . sample
11, 111 . . . piezoelectric scanner
11*a*, 111*a* . . . XY scanner
11*b*, 111*b* . . . Z scanner
12, 112 . . . sample stage
13, 113 . . . cantilever
14, 114 . . . probe
15 . . . laser diode
16 . . . lens
17 . . . beam splitter
18 . . . mirror
19, 119 . . . light detector
20, 120 . . . photometric unit
121 . . . head section
131 . . . displacement amount calculation unit
132, 132*a* . . . scan control unit
133 . . . scanner drive unit
134, 134*a* . . . data processing unit
135 . . . display
136 . . . feed screw
137 . . . screw drive mechanism
138, 138*a* . . . sample thickness acquisition unit
139 . . . correlative information determination unit
140 . . . input unit

The invention claimed is:

1. A scanning probe microscope for detecting a three-dimensional shape or a physical quantity of a sample surface by scanning the sample surface by a minute probe, comprising:
   a) sample moving means including a cylindrical piezoelectric scanner and configured to move a sample arranged on an upper end surface of the piezoelectric scanner by bending the piezoelectric scanner by an applied voltage;
   b) scanning control means configured to control a relative position of the probe and the sample by controlling the applied voltage;
   c) sample thickness acquisition means configured to acquire a thickness value of the sample; and
   d) correlative information determination means configured to determine correlative information showing a corresponding relationship between the applied voltage to the piezoelectric scanner and a displacement amount of a surface of the sample in a horizontal direction using the thickness value,
   wherein the scanning control means performs controlling of the relative position using the correlative information.

2. The scanning probe microscope according to claim 1, further comprising:
   e) sample thickness measurement means configured to measure a thickness of the sample,
   wherein the sample thickness acquisition means acquires a thickness value of the sample from the sample thickness measurement means.

3. The scanning probe microscope according to claim 2, wherein the sample thickness measurement means is a mechanism configured to drive the piezoelectric scanner and/or a probe in a direction that the sample and the probe move close to each other or move away from each other, and configured to obtain a thickness value of the sample from a driven amount of the piezoelectric scanner and/or the probe from a state in which the piezoelectric scanner and the probe are away from by a predetermined distance to a state in which the surface of the sample arranged on the upper end surface of the piezoelectric scanner and the probe are moved closer by a predetermined distance.

4. The scanning probe microscope according to claim 1, further comprising:
   f) user input receiving means configured to receive an input of a thickness value of the sample by a user,
   wherein the sample thickness acquisition means acquires the thickness value of the sample from the user input receiving means.

5. The scanning probe microscope according to claim 1, further comprising:
   g) measurement value input receiving means configured to receive an input of a measurement value of the thickness value of the sample from an external measurement device,
   wherein the sample thickness acquisition means acquires the thickness value of the sample from the measurement value input receiving means.

6. A scanning probe microscope for detecting a three-dimensional shape or a physical quantity of a sample surface by scanning the sample surface by a minute probe, comprising:

a) sample moving means including a cylindrical piezoelectric scanner and configured to move a sample arranged on an upper end surface of the piezoelectric scanner by bending the piezoelectric scanner by an applied voltage;

b) three-dimensional distribution data generation means configured to create three-dimensional distribution data showing a certain physical quantity at each position on the sample surface collected by moving the sample with respect to the probe by the sample moving means;

c) sample thickness acquisition means configured to acquire a thickness value of the sample; and d) correlative information determination means configured to determine correlative information showing a corresponding relationship between the applied voltage to the piezoelectric scanner and a displacement amount of a surface of the sample in a horizontal direction using the thickness value, wherein the three-dimensional distribution data generation means creates the three-dimensional distribution data using the correlative information.

7. The scanning probe microscope according to claim 6, further comprising:

e) sample thickness measurement means configured to measure a thickness of the sample, wherein the sample thickness acquisition means acquires a thickness value of the sample from the sample thickness measurement means.

8. The scanning probe microscope according to claim 7, wherein the sample thickness measurement means is a mechanism configured to drive the piezoelectric scanner and/or a probe in a direction that the sample and the probe move close to each other or move away from each other, and configured to obtain a thickness value of the sample from a driven amount of the piezoelectric scanner and/or the probe from a state in which the piezoelectric scanner and the probe are away from by a predetermined distance to a state in which the surface of the sample arranged on the upper end surface of the piezoelectric scanner and the probe are moved closer by a predetermined distance.

9. The scanning probe microscope according to claim 6, further comprising:

f) user input receiving means configured to receive an input of a thickness value of the sample by a user, wherein the sample thickness acquisition means acquires the thickness value of the sample from the user input receiving means.

10. The scanning probe microscope according to claim 6, further comprising:

g) measurement value input receiving means configured to receive an input of a measurement value of the thickness value of the sample from an external measurement device, wherein the sample thickness acquisition means acquires the thickness value of the sample from the measurement value input receiving means.

* * * * *